March 6, 1934.

N. L. SNOW ET AL

Re. 19,105

BOILER CLEANER

Original Filed Dec. 26, 1923 4 Sheets-Sheet 1

INVENTOR.
Norman L. Snow
Curtis L. House

BY

Whittemore, Hulbert & Whittemore, Belknap

ATTORNEYS.

March 6, 1934.
N. L. SNOW ET AL
Re. 19,105
BOILER CLEANER
Original Filed Dec. 26, 1923 4 Sheets-Sheet 2
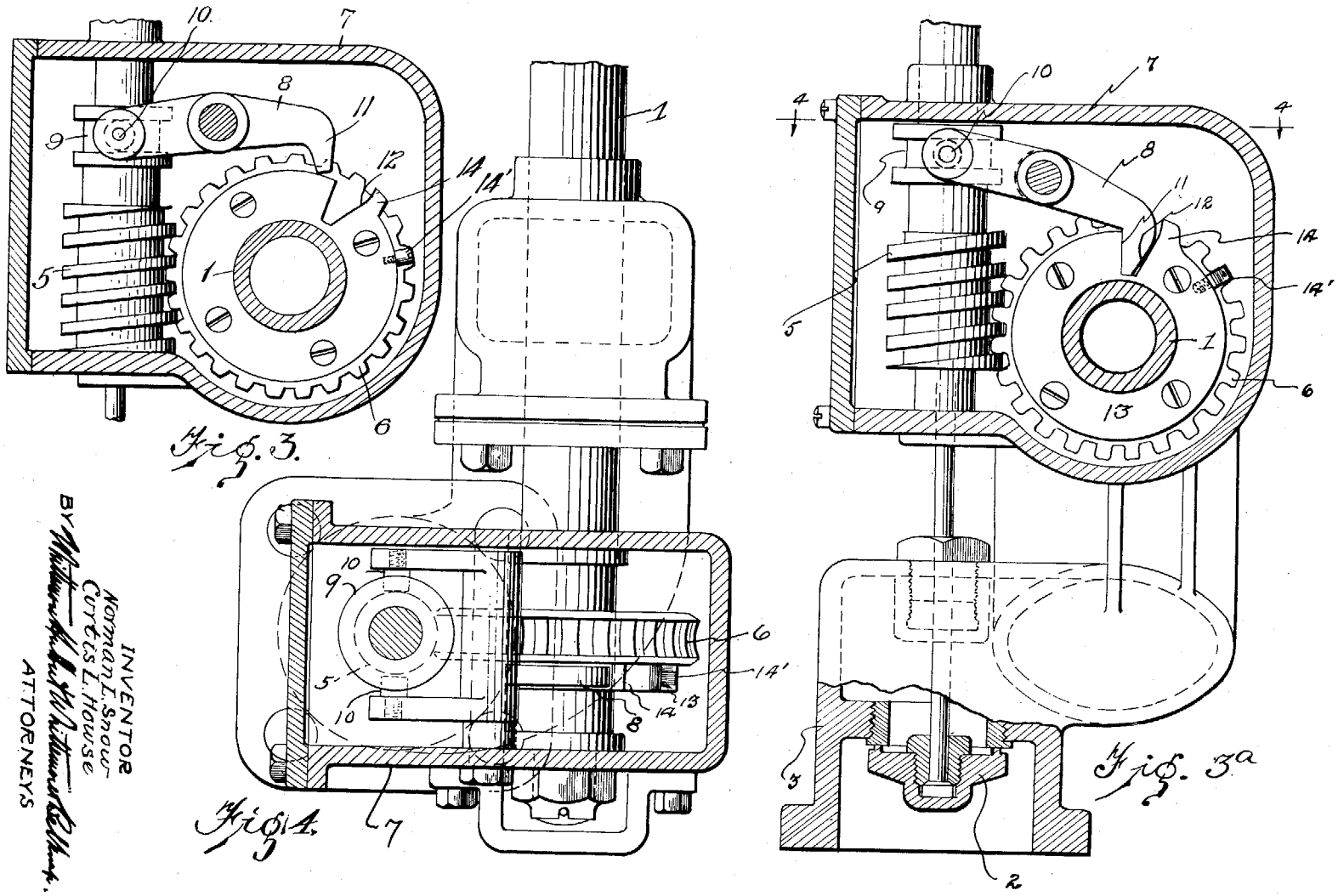
INVENTOR
Norman L. Snow
Curtis L. Howse
BY Whittemore, Hulbert & Whittemore & Belknap.
ATTORNEYS March 6, 1934. N. L. SNOW ET AL Re. 19,105
BOILER CLEANER
Original Filed Dec. 26, 1923 4 Sheets-Sheet 3
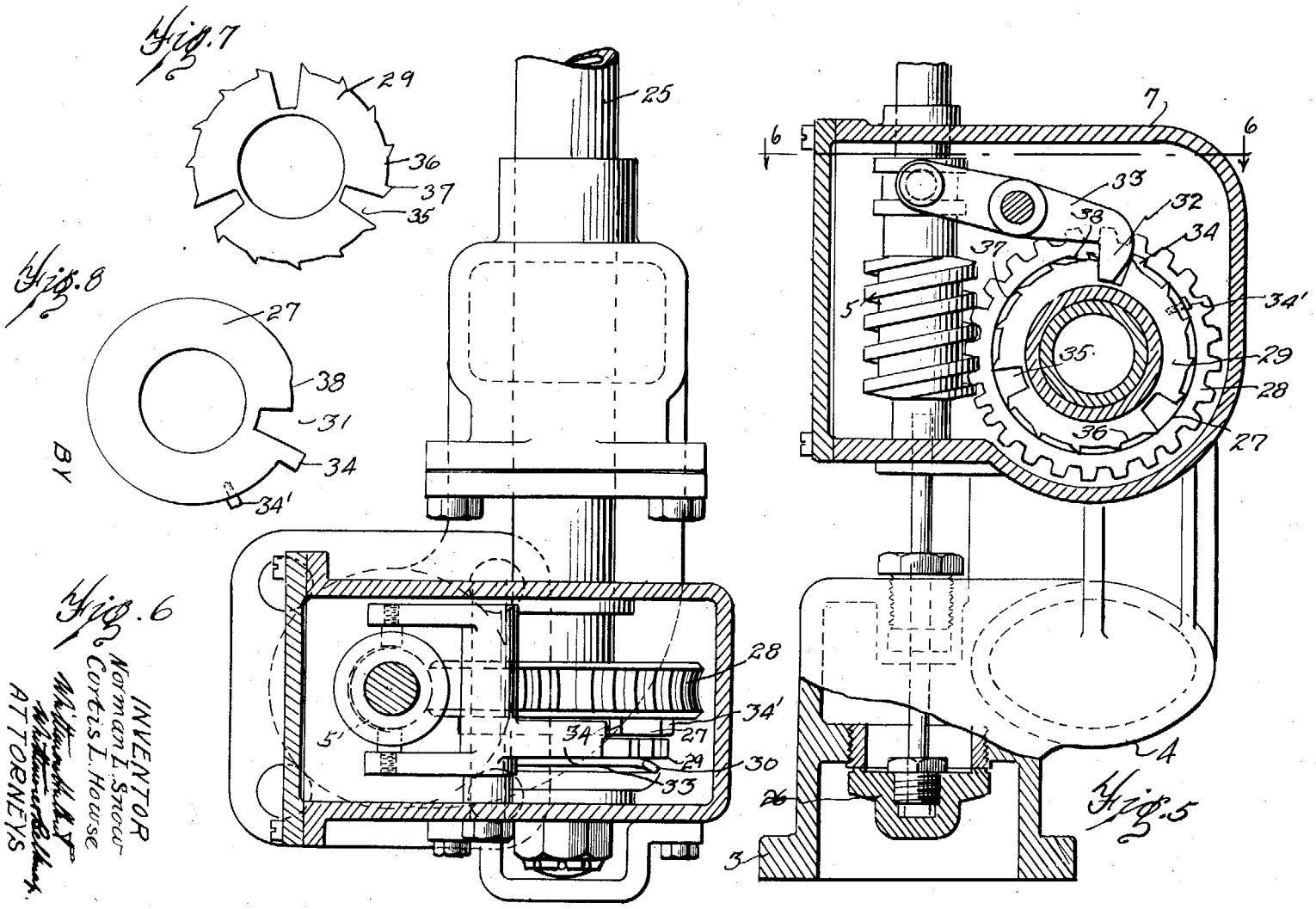
INVENTOR
Norman L. Snow
Curtis L. House
BY
Whittemore Hulbert & Belknap
ATTORNEYS March 6, 1934. N. L. SNOW ET AL Re. 19,105

BOILER CLEANER

Original Filed Dec. 26, 1923 4 Sheets-Sheet 4

INVENTOR
Norman L. Snow
Curtis L. House
BY Whittemore, Hulbert & Whittemore & Belknap
ATTORNEYS Reissued Mar. 6, 1934 Re. 19,105

UNITED STATES PATENT OFFICE 19,105

BOILER CLEANER

Normal L. Snow, New Canaan, Conn., and Curtis L. Howse, Detroit, Mich., assignors to Diamond Power Specialty Corporation, Detroit, Mich., a corporation of Michigan Original No. 1,759,870, dated May 27, 1930, Serial No. 682,798, December 26, 1923. Application for reissue May 26, 1932, Serial No. 613,787

25 Claims. (Cl. 122—392)

The invention relates to boiler cleaners and refers more particularly to boiler cleaners of that type having a blower element through which the cleaning fluid such as steam or the like is discharged against the parts of the boiler to be cleaned. One of the objects of the invention is the provision of a boiler cleaner having means for holding the valve which controls the admission of the steam or the like to the blower element open for an angular travel of the blower element greater than 360°. Another object is the provision of a boiler cleaner having means for holding the valve continuously open during a plurality of oscillatory cycles of the blower element. With these as well as other objects in view, the invention resides in the novel features of construction and combinations and arrangements of parts as more fully hereinafter set forth.

In the drawings:

Figure 1 is a side elevation of a boiler cleaner embodying our invention;

Figures 2 and 3 are cross sections on the lines 2—2 and 3—3 respectively of Figure 1;

Figure 3ª is a view corresponding to Figure 3 showing the lever in engagement with the notch of the disc, the parts being in this position before and after the blowing cycles;

Figure 4 is a cross section on the line 4—4 of Figure 3ª;

Figure 5 is a view similar to Figure 3ª showing a modified construction;

Figure 6 is a cross section on the line 6—6 of Figure 5;

Figures 7 and 8 are end views of the control members used in the modified construction;

Figure 2:
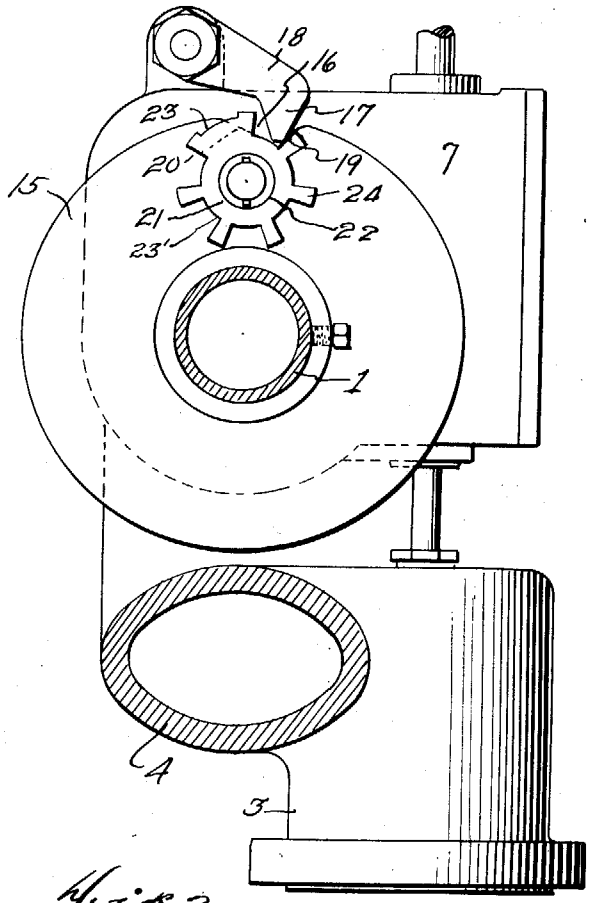
Figure 1:
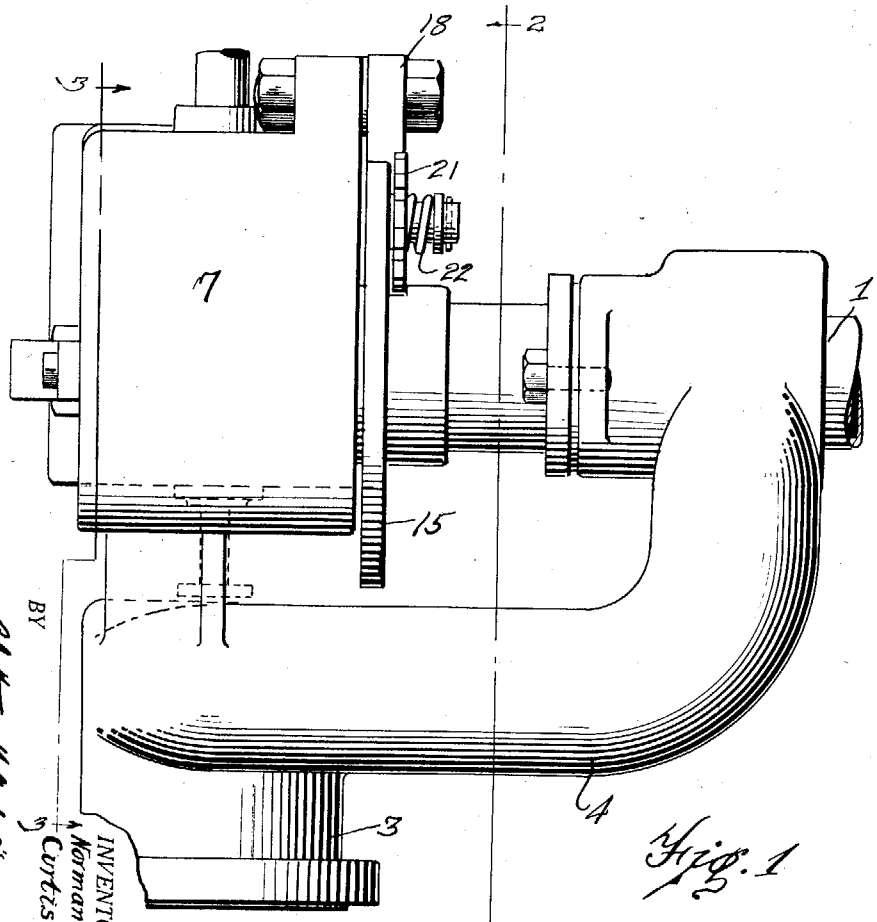

In the boiler cleaner shown in Figures 1, 2, 3, 3ª and 4, 1 is the blower element through which the cleaning fluid such as steam or the like is discharged upon the parts of the boiler to be cleaned. 2 is the valve located in the valve casing 3 and controlling the admission of the steam or the like through the conduit 4 to the blower element, one end of this conduit surrounding a ported portion of the blower element and the other end connecting into the valve casing. Both the blower element and the valve are actuated by a common mechanism including the worm 5 and the worm wheel 6 located within the gear housing 7. The blower element is connected to the worm wheel while the valve is connected to the worm and opened and closed by an axial movement of the worm transversely of the axis of the worm wheel.

8 is a lever pivoted intermediate its ends within the gear housing 7, the upper end of this lever being bifurcated to embrace the collar 9 secured within the gear housing to the worm shaft. The bifurcations of the lever are connected to the collar by the pins 10. The lower end of this lever has the transverse nose 11 which is adapted to engage in the notch 12 in the disk 13 secured to one side of the worm wheel 6. The end of this nose is also adapted to engage the periphery of the disk when the valve is open and the blower element has been rotated from its original position whereby the valve is held open until the blower element is returned to its original position, at which time the nose is ordinarily free to enter the notch 12 in the disk and allow the valve to close.

As thus far described and with the parts in position shown in Figure 3ª, rotation of the worm shaft in a clockwise direction first compels axial movement of the worm 5 and its shaft transversely of the worm wheel 6, thereby opening the valve 2. This axial movement also withdraws the nose 11 of the lever 8 from the notch 12 of the disk 13 so that when the axial movement of the worm and its shaft has been limited as by means of the worm contacting with a wall of the gear housing 7, continued clockwise rotation of the worm shaft will then compel a clockwise rotation of the worm wheel 6, and the blower element 1, which is continued until the lug 14′ upon the periphery of the disk 13 and adjacent to its notch 12, contacts with the lever 8. The worm shaft then is revolved in the opposite or counterclockwise direction and since the nose 11 of the lever 8 is in engagement with the periphery of the disk 13, axial return movement of the worm 5 and its shaft and a consequent closing of the valve 2 is prevented. Therefore, the worm wheel 6 with the blower element is rotated in a counter-clockwise direction until the lug 14 upon the periphery of the disk 13 engages the nose 11 of the lever and the notch 12 of the disk 13 comes opposite the nose, which latter may then engage therein, thereby allowing axial return movement of the worm and worm shaft and closing of the valve. The lug 14′ is adjustably mounted upon the disk 13 to permit of varying the angular movement of the latter.

For the purpose of holding the valve continuously open for a predetermined number of oscillatory cycles of the blower element, we have provided the control disk 15 which is secured to the blower element 1 outside the gear housing and is oscillated therewith. This disk is provided in its periphery with the notch 16 which is engageable in by the nose 17 of the dog 18 pivoted upon the gear housing. This notch presents the abrupt and inclined shoulders 19 and 20 engageable with the nose of the dog upon rotation of the control disk in a counter-clockwise direction and a clockwise direction respectively. The abrupt shoulder is so positioned that it comes into contact with the nose of the dog and limits further rotation of the control disk, and consequently of the blower element in a counter-clockwise direction prior to the engagement of the nose 11 of the lever 8 with the lug 14 and the notch 12 of the disk 13, whereby axial return movement of the worm 5 and consequent closing of the valve 2 is prevented. The parts when in this position are shown in Figures 2 and 3. The inclined shoulder 20 allows the nose of the dog to ride thereover upon rotation of the control disk in a clockwise direction. 21 is a second control disk which is mounted upon the control disk 15 and frictionally held thereagainst by the coil spring 22. This control disk is provided in its periphery with the series of major notches 23′ and the minor notch 23, each of the notches being of the same width. The control disk 21 is mounted upon the control disk 15 in such a position that the notches are adapted to register with the notch 16 of the latter disk and the bases of the major notches are adapted to be in substantial alignment with the base of the notch 16. The nose 17 of the dog 18 is of sufficient width to engage both control disks 15 and 21 as shown in Figure 1 so that when one of the major notches 23′ registers with the notch 16, the nose of the dog will be permitted to come in engagement with the abrupt shoulder 19 of the control disk 15 upon rotation of the latter in a counter-clockwise direction. The spring 22 is sufficiently strong to normally hold the disk 21 against rotation so that upon rotation of the control disk 15 in a clockwise direction the nose 17 rides over the projections 24 of the second control disk between which the notches 23′ are formed. However, upon movement of the disk 15 in a counter-clockwise direction, the nose 17 engages one of the projections 24 to move the disk 21 a sufficient distance about its axis to bring the next succeeding notch of the disk 21 into registration with the notch 16. The number of major notches 23′ in the second control disk 21 determines the number of oscillatory cycles that may be taken by the blower element while the valve, which controls the admission of the steam or the like thereto, remains open. However, as soon as the minor notch 23 of the second control disk comes opposite or into registration with the notch 16 of the first control disk, the base thereof coming into contact with the nose 17 of the dog upon rotation of the blower element and first control disk in a counter-clockwise direction, will hold the nose of the dog from contacting with the abrupt shoulder 19, and as a consequence will permit of continued rotation of the blower element and first control disk in a counter-clockwise direction until the notch 12 of the disk 13 is engaged in by the nose 11 of the lever 8 as shown in Figure 3[a], after which, continued rotation of the worm shaft in a counter-clockwise direction axially returns the worm to its original position and closes the valve.

In the modified construction of boiler cleaner shown in Figures 5, 6, 7 and 8, the blower element 25 and the valve 26 controlling the admission of steam or the like thereto are actuated in the same manner as the blower element and valve shown in Figures 1, 2, 3 and 4. However, the mechanism for holding the valve continuously open during a predetermined number of oscillatory cycles of the blower element, is different. In detail, 27 is a disk secured to the outer side of the worm wheel 28 and 29 is a second disk concentric with the disc 27 and frictionally held against its outer side by suitable means such as the spring 30. The disk 27 is provided with the peripheral notch 31 engageable in by the nose 32 of the lever 33 and is also provided with the peripheral projections 34 and 34′, the former being adjacent to one side of the notch 31 and the latter being adjustably secured to the disk. The projection 34 is adapted to engage the nose 32 of the lever upon rotation of the disk in a counter-clockwise direction to limit rotation of the disk in this direction and the projection 34′ is adapted to engage the lever 33 upon rotation of the disk in a clockwise direction to prevent the nose 32 of the lever from engaging in the notch 31 and to limit rotation of the disk in a clockwise direction. The second disk 29 is provided with the peripheral major notches 35 which are adapted to align with the notch 31 and to be engaged in by the nose 32 of the lever 33 when so aligned. The second disk is also provided with the peripheral minor notches 36 formed between the peripheral projections or teeth 37, the number of these minor notches between the major notches determining the number of oscillatory cycles that may be taken by the blower element while the valve is held open.

For the purpose of securing a rotation of the disk 29 relative to the disk 27 to successively advance the notches of the disk 29, the periphery of the disk 27 adjacent its notch 31 and on the opposite side from the projection 34 is cut away at 38 a sufficient distance to permit the nose 32 of the lever 33 coming into engagement with the projection or tooth 37 of the disk 29 during the final portion of the rotation of the blower element and two disks in a counter-clockwise direction and holding the disk 29 from rotation a sufficient time to advance this disk relative to the disk 27 a distance of one of its notches.

In operation and assuming the parts to be in the position shown in Figure 5, rotation of the worm shaft and worm in a clockwise direction will first compel an axial movement of the worm shaft and worm and opening of the valve 26. During this axial movement, the lever 33 is being swung about its pivot so that when the valve has been opened, the nose 32 of the lever 33 has become disengaged from the notch 31 of the disk 27 and the major notch 35 of the disk 29. Continued rotation of the worm shaft in a clockwise direction then compels rotation of the worm wheel 28, blower element 25 and disks 27 and 29 until the projection 34′ of the disk 27 comes into engagement with the lever 33 thereby limiting the rotation. During the clockwise rotation of the disk 27, the disk 29 also rotates clockwise, the spring 30 tending to hold the disk 29 against the disk 27 with sufficient force to assure this operation. During this clockwise rotation therefore, the nose 32 of the lever 33 rides up over the teeth 37, there being insufficient force exerted on these teeth to affect a rotation of the disk 29 in a counter-clockwise direction. The worm shaft is then rotated in a counter-clockwise direction compelling rotation of the worm wheel, blower element, and two control disks in a counter-clockwise direction and compelling the valve 26 to remain in open position, owing to the fact that the nose 32 of the lever 33 rides upon the periphery of the disk 27. During the final portion of the rotation of the worm wheel and blower element in the counter-clockwise direction the nose 32 of the lever is permitted to engage a projection or tooth 37 of the disk 29 adjacent the major notch 35 previously engaged in owing to the cut away portion 38 of the disk 27. This nose engages the projection or tooth a sufficient distance in advance of the engagement of the projection 34 upon the disk 27 with the nose to advance the disk 29 relative to the disk 27, a distance of one notch of the disk 29. Also, the holding of the disk 29 from rotation brings the first minor notch 36 of the disk 29 into registration with the notch 31 in the disk 27 when rotation in a counter-clockwise direction has been limited so that the nose 32 of the lever is prevented from engaging in the notch 31 of the disk 27 and allowing axial return movement of the worm and worm-shaft and closing of the valve. The worm-shaft is then rotated in a clockwise direction until the projection 34′ engages the lever 33, after which it is rotated in a counter-clockwise direction and the steps previously described are again carried out. These oscillatory cycles continue until the succeeding major notch 35 of the disk 29 comes into registration with the notch 31 of the disk 27, at which time the nose 32 of the lever 33 is permitted to enter the notch 31 and in turn permits axial return movement of the worm and worm-shaft and closing of the valve.

Figure 9:
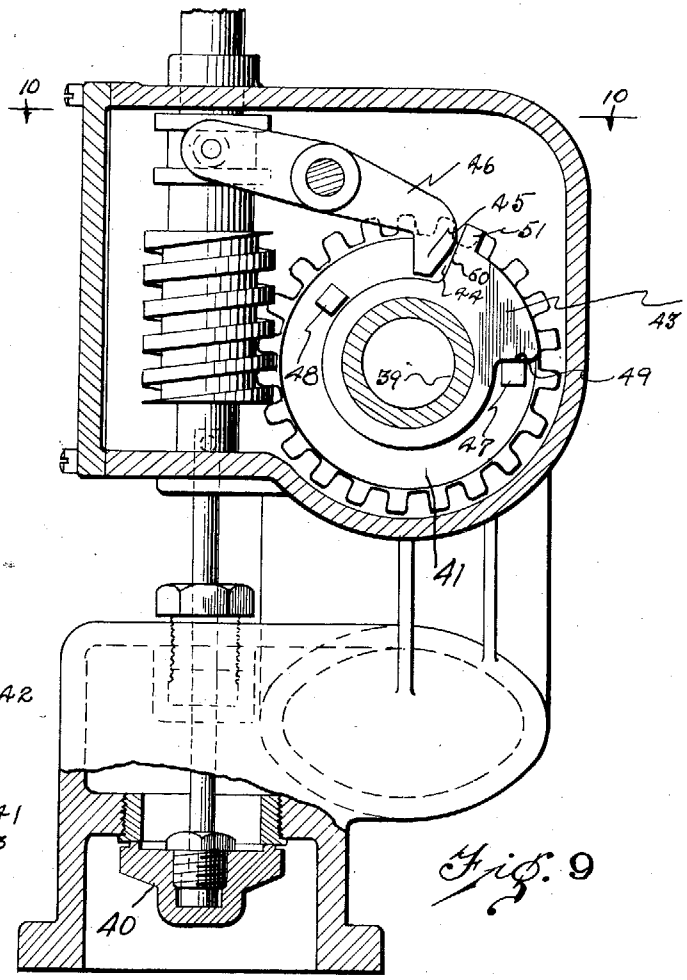
Figure 9 is a view similar to Figure 2 and showing another modified construction.
Figure 10:
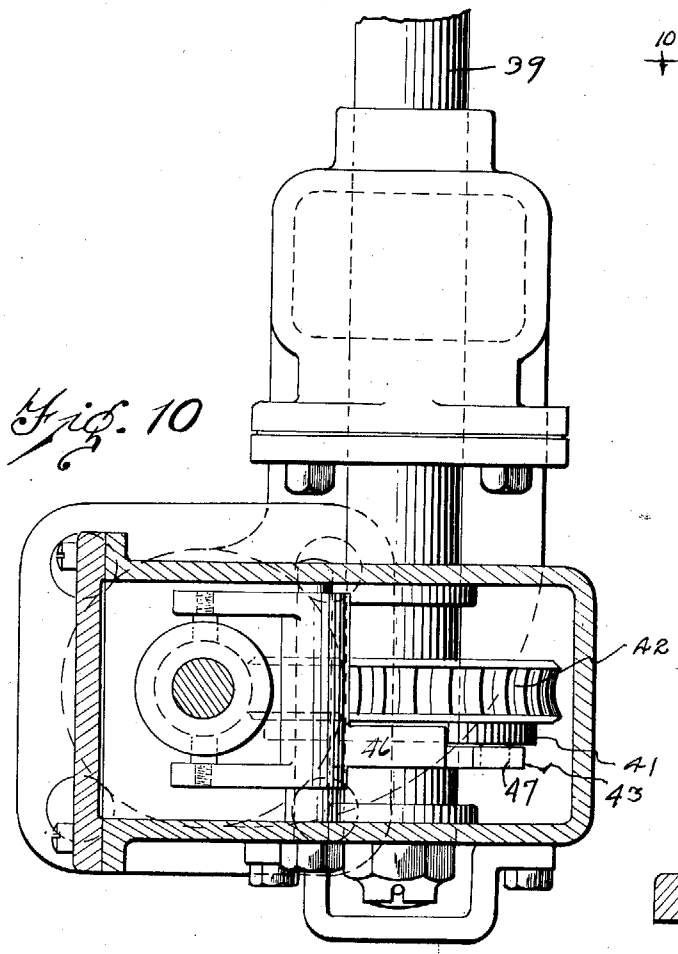
Figure 10 is a cross section on the line 10—10 of Figure 9.

As shown in Figures 9 and 10, the blower element 39 and the valve 40 controlling the admission of steam or the like to the blower element are actuated in the same manner as the previously described boiler cleaners. The control mechanism in this boiler cleaner permits of rotation of the blower element through an arc greater than 360° while the valve remains open and comprises the disk 41 at the outer side of and secured to the worm wheel 42 and the second disk 43 at the outer side of the disk 41. The disk 41 is provided with the peripheral notch 44 for engagement in by the nose 45 of the lever 46 and its periphery is adapted to be engaged by the nose 45 of the lever to hold the latter from swinging during rotation of the disk in a counter-clockwise direction until the notch 44 comes opposite the nose of the lever. The disk 41 is provided with the transverse projections 47 and 48 which are engageable with the shoulders 49 and 50 respectively of the second disk 43, the arrangement being such that considerable lost motion is provided between the transverse projections and the shoulders. The disk 43 is provided with the peripheral projection 51 adjacent its shoulder 50 and adapted to engage the lever 46 upon rotation of the disk in a counter-clockwise direction.

In operation, the worm shaft is rotated in a clockwise direction which first compels axial movement of the worm and opening of the valve 40. When the valve is in open position, the nose 45 of the lever 46 is out of engagement with the notch 44 of the disk 41 so that upon continued rotation of the worm shaft in a clockwise direction, the worm wheel 42, blower element 39, disks 41 and 43 are rotated in a clockwise direction. During this rotation, the projection 51 of the disk 43 comes into contact with the lever 46, holding the lever in its outer position and stopping the rotation of the disk in a clockwise direction. However, the worm wheel, blower element, and the disk 41 are further rotated in a clockwise direction until the transverse projection 48 upon the disk 41 engages the shoulder 50 upon the disk 43 at which time rotation is stopped. With this arrangement, it will be seen that the valve is held open for a rotation of the blower element through an arc greater than 360°. After rotation of the parts in a clockwise direction has been stopped, the worm shaft is then rotated in a counter-clockwise direction, which then brings the transverse projection 47 into engagement with the shoulder 49 to rotate the disk 43 with the disk 41, the blower element 39 and the worm wheel 42 until the nose 45 of the lever 46 drops into the notch 44 of the disk 41, after which the worm axially returns to its original position and closes the valve 40.

It will be apparent that the cleaner forming the subject matter of this invention may be utilized for cleaning a heat transfer apparatus or fluid heater of any character. It is to be therefore understood that the term "boiler", wherever used in the specification or claims, is to be construed as meaning a heat transfer apparatus or fluid heater of any character and that the term "boiler cleaner" is to be construed as meaning a cleaner for any such apparatus.

What we claim as our invention is:

1. In a boiler cleaner, the combination with an oscillatory blower element, and a valve for controlling the admission of cleaning fluid to said blower element, of means dependent upon the angular travel of said blower element for holding said valve open and permitting said valve to close, and means for limiting the angular travel of said blower element for a predetermined number of oscillatory cycles thereof to retain said first mentioned means in position to hold said valve open.

2. In a boiler cleaner, the combination with an oscillatory blower element and a valve for controlling the admission of cleaning fluid to said blower element, of a notched member movable with said blower element, a second member cooperating with said notched member for holding said valve open, said second member being adapted to engage in said notch to limit the angular movement of said blower element in one direction, and means operated upon predetermined movements of said blower element adapted to hold said second member from engaging in said notch.

3. In a boiler cleaner, the combination with an oscillatory blower element, and a valve for controlling the admission of cleaning fluid to said blower element, of a disk movable with said blower element and provided with a notch, a second disk adjacent to said first mentioned disk and provided with a notch adapted to register and align with said first mentioned notch, said second disk being also provided with intermediate notches adapted to be successively positioned opposite said first mentioned notch, a lever having a portion adapted to engage in said first mentioned notch when said registering and aligning notch of the second said disk is aligned with the notch of the first said disk, said lever controlling the closing of said valve, and means for effecting a relative movement between said disks sufficient to bring the notches of said second mentioned disk successively opposite the first mentioned notch.

4. In a boiler cleaner, the combination with an oscillatory blower element and a valve for controlling the admission of cleaning fluid to said blower element, of means for holding said valve open during a plurality of oscillatory cycles of the blower element and for automatically closing said valve upon completion of the last of said cycles and means for predetermining the number of oscillatory cycles during which said valve is held open.

5. In a boiler cleaner, the combination with an oscillatory blower element, a valve for controlling the admission of a cleaning fluid to said blower element, common means for oscillating said blower element and opening and closing said valve, of means for preventing said valve from closing during a predetermined plurality of oscillatory cycles of the blower element, and for permitting closing of said valve only upon completion of the last of said cycles.

6. In a boiler cleaner, the combination with a blower element movable through a number of cycles for cleaning parts of a boiler, of a valve for controlling the admission of a cleaning fluid to said blower element, means for holding said valve open during a plurality of complete cycles of the blower element and for automatically closing said valve upon completion of the last of said cycles and means for predetermining the number of cycles during which said valve is held open.

7. In a boiler cleaner, the combination with an oscillatory blower element and a valve for controlling the admission of a cleaning fluid to said blower element, of means for automatically opening the valve and holding the blower element against movement during the opening of the valve, said means thereafter holding said valve open during a plurality of oscillatory cycles of the blower element.

8. In a boiler cleaner, the combination with an oscillatory blower element and a valve for controlling the admission of a cleaning fluid to said blower element, of means for automatically opening the valve and holding the blower element against movement during the opening of the valve, said means thereafter holding said valve open during a plurality of oscillatory cycles of the blower element, and thereafter closing said valve upon completion of the last of said cycles, said means acting to hold the blower element stationary during the closing of the valve.

9. In a boiler cleaner, the combination with an oscillatory blower element and a valve for controlling the admission of a cleaning fluid to said blower element, of means for holding said valve open during a plurality of oscillatory cycles of the blower element and for automatically closing said valve upon completion of the last of said cycles, and means for regulably controlling the arc of oscillation of said blower element.

10. In a boiler cleaner, the combination with an oscillatory blower element, and a valve for controlling the admission of a cleaning fluid to said blower element, of means including a member oscillatory with the blower element for automatically holding said valve open during a plurality of oscillatory cycles of the blower element, said member being provided with a stop for regulably controlling the arc of oscillation of said blower element.

11. In a boiler cleaner, the combination with an oscillatory blower member, of a valve member for controlling the admission of cleaning fluid to said blower member, one of said members being automatically controlled by movement of the other of said members, and means for holding said valve member open for a predetermined number of oscillatory cycles of the blower member.

12. In a boiler cleaner, an oscillatable blower element, a valve for controlling the flow of cleaning fluid to said element, a gear fixed to the blower element, a worm for moving said valve to open and closed positions and for oscillating said gear, means for locking said gear against oscillation during movement of said valve by said worm to open position, said means being releasable when said valve is fully opened to permit oscillation of said gear by said worm, and means for preventing locking of said gear by said locking means when said valve is in open position until said gear has been oscillated a predetermined number of times.

13. In a boiler cleaner, an oscillatable blower element, a valve for controlling the flow of cleaning fluid to said blower element, a gear fixed to said blower element, a worm for moving said valve to open and closed positions and for oscillating said gear, a lever for locking said gear against oscillation during movement of said valve to open position by said worm, said lever being connected to said worm whereby the same is moved to a position to permit oscillation of said gear when said valve is fully open, and means for maintaining said lever in said last mentioned position for a predetermined number of oscillatory movements of said gear.

14. In a boiler cleaner, an oscillatable blower element, a valve for controlling the flow of cleaning fluid to said blower element, a gear fixed to said blower element, a worm for moving said valve to open and closed positions and for oscillating said gear, a lever for locking said gear against oscillation during movement of said valve to open position by said worm, said lever being connected to said worm whereby the same is moved to a position to permit oscillation of said gear when said valve is fully open, and means for maintaining said lever in said last mentioned position for a predetermined number of oscillatory movements of said gear, said last mentioned means including a pair of disks mounted for movement with said gear and relative to each other, said disks being provided with notches adapted to be periodically aligned upon continued oscillation of said gear for engagement by said lever.

15. In a fluid heater cleaner, the combination with an oscillatory blower element, a valve for controlling the admission of cleaning fluid to said blower element and means for opening said valve, of means operable only upon the completion of a predetermined plural number of oscillatory cycles of said blower element to close the valve whereby the valve remains open during said predetermined number of oscillatory cycles of the blower element.

16. In a fluid heater cleaner, the combination with an oscillatory blower element and a valve for controlling the admission of cleaning fluid to said blower element, and means limiting the operation of the blower element to a predetermined plural number of oscillatory cycles, of means for oscillating said blower element, means for actuating said valve and means so interconnecting said valve and blower element actuating means that said valve remains open only during the movement of said blower element through said predetermined plural number of oscillatory cycles.

17. In a fluid heater cleaner, the combination with an oscillatory blower element and a valve for controlling the admission of cleaning fluid to said blower element, of means so interconnecting said valve and blower element that said valve remains open during a predetermined number of oscillatory cycles of said blower element and automatically closes upon the completion of said predetermined number of cycles and means for predetermining the number of cycles of movement of said blower element during which said valve remains open.

18. In a fluid heater cleaner, the combination with an oscillatory blower element, means for oscillating said blower element, and a valve and its operating means for controlling the admission of cleaning fluid to said blower element, of means so interconnecting the valve operating means and blower element that before said blower element is oscillated said valve opens, remains open for a plurality of oscillatory cycles of said blower element and then automatically closes and means for predetermining the number of oscillatory cycles through which said blower element is moved before said valve is closed.

19. In a fluid heater cleaner, the combination with a movable blower member, a valve for controlling the admission of cleaning fluid to said blower member, means for moving the blower member, and means for actuating the valve, of means so interconnecting the valve actuating means and blower member that the means for moving the blower member is not operated until the valve is opened and the valve remains open during a predetermined plural number of cycles of movement of the blower member and means for predetermining the number of cycles of movement of the blower member during which the valve remains open.

20. In a fluid heater cleaner, the combination with a blower member movable through a plurality of cycles and a valve for controlling the admission of cleaning fluid to the blower member, of means so interconnecting the valve and blower member that said blower member is not moved until after an opening movement has been imparted to the valve while the valve remains open only during movement of the blower member through a predetermined plural number of complete cycles and means for predetermining the number of cycles of movement of the blower member during which the valve remains open.

21. In a fluid heater cleaner, the combination with a blower member movable through a plurality of cycles, a valve for controlling the admission of cleaning fluid to the blower member, and means for opening and closing the valve, of means operating only after the valve has been moved to move the blower member through a predetermined plural number of said cycles, and means for predetermining the number of cycles through which said blower element is moved and for terminating the movement of said blower element upon the completion of said predetermined number of cycles.

22. In a fluid heater cleaner, the combination with a blower member movable through a plurality of oscillatory cycles, a valve for controlling the admission of cleaning fluid to the blower member, and means for opening the valve, of means arranged to operate only after said valve is opened for operating the blower member through a number of said cycles, and means limiting the operation of the blower member to a predetermined plural number of said cycles.

23. In a fluid heater cleaner, the combination with a blower member mounted for oscillation through an arc greater than 180°, a valve member for controlling the admission of cleaning fluid to to said blower member, and means for opening said valve, of means arranged to operate only after the valve is open for moving said blower member through a predetermined number of said oscillatory cycles, means providing that said valve remain open during movement of said blower member through all of said cycles and means for predetermining the number of cycles through which said blower element is moved and for terminating the movement of said blower element upon the completion of the last of said cycles.

24. In a fluid heater cleaner, a blower member movable through a plurality of cycles, a valve for controlling the admission of cleaning fluid to the blower member, a single means for opening the valve and effecting a movement of the blower member through a predetermined plural number of said cycles prior to closing of the valve, and means for predetermining the number of cycles through which said blower element is moved prior to closing of the valve.

25. In a fluid heater cleaner, a blower member movable through a plurality of oscillatory cycles, a valve for controlling the admission of cleaning fluid to the blower member, a single means for effecting a sequential actuation of the valve and oscillation of the blower member, means providing that said valve remain open during movement of said blower member through a predetermined plural number of oscillatory cycles and that said valve close upon the completion of said predetermined plural number of oscillatory cycles and means for predetermining the number of cycles through which said blower element is moved before said valve is closed.

NORMAN L. SNOW.
CURTIS L. HOWSE.